United States Patent
Ayers et al.

(10) Patent No.: US 9,654,711 B2
(45) Date of Patent: May 16, 2017

(54) POWER REDUCTION FOR IMAGE SENSOR WITH RAW IMAGE SCALER

(71) Applicant: Sony Semiconductor Solutions Corporation, Kanagawa (JP)

(72) Inventors: Thomas Richard Ayers, Morgan Hill, CA (US); Edward Elikhis, Raanana (IL); Ping Wah Wong, Sunnyvale, CA (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 14/857,377

(22) Filed: Sep. 17, 2015

(65) Prior Publication Data

US 2017/0085818 A1   Mar. 23, 2017

(51) Int. Cl.

| | |
|---|---|
| *H04N 5/369* | (2011.01) |
| *H04N 5/262* | (2006.01) |
| *H04N 5/378* | (2011.01) |
| *H04N 9/04* | (2006.01) |

(52) U.S. Cl.
CPC ......... *H04N 5/3698* (2013.01); *H04N 5/2628* (2013.01); *H04N 5/378* (2013.01); *H04N 9/04* (2013.01)

(58) Field of Classification Search
CPC .... H04N 5/3698; H04N 5/2628; H04N 5/378; H04N 9/04
See application file for complete search history.

(56) References Cited

U.S. PATENT DOCUMENTS

| | | | | |
|---|---|---|---|---|
| 6,104,844 | A * | 8/2000 | Alger-Meunier | H04N 5/378 250/208.1 |
| 6,738,533 | B1 * | 5/2004 | Shum | G06T 15/205 382/299 |
| 7,339,621 | B2 * | 3/2008 | Fortier | H04N 5/23241 348/294 |
| 2003/0182341 | A1 * | 9/2003 | Snyder | H04N 19/126 708/550 |
| 2005/0068439 | A1 * | 3/2005 | Kozlowski | H03F 3/005 348/308 |
| 2012/0138775 | A1 * | 6/2012 | Cheon | H04N 5/361 250/208.1 |
| 2015/0311914 | A1 * | 10/2015 | Chae | H03M 3/484 250/208.1 |

* cited by examiner

*Primary Examiner* — Nicholas Giles
(74) *Attorney, Agent, or Firm* — Michael Best & Friedrich LLP

(57) ABSTRACT

A system and method for scaling an image includes receiving raw image data comprising input pixel values which correspond to pixels of an image sensor, filtering pixels in a spatial domain, and filtering pixels in a frequency domain according to an oversampling ratio. The system and method may also include outputting scaled image data as output pixel values, which correspond to subgroups of the input pixel values. The filtering may be done according to a Bayer-consistent ruleset which includes a set of filter weights and a series of scaling rules. The oversampling ratio is set to minimize an error after the filtering in the spatial domain and the filtering in the frequency domain.

27 Claims, 13 Drawing Sheets

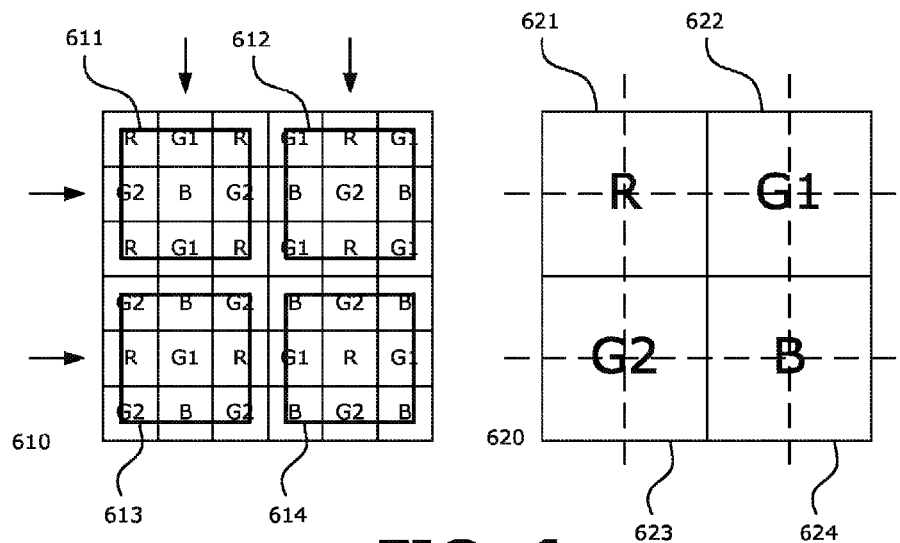
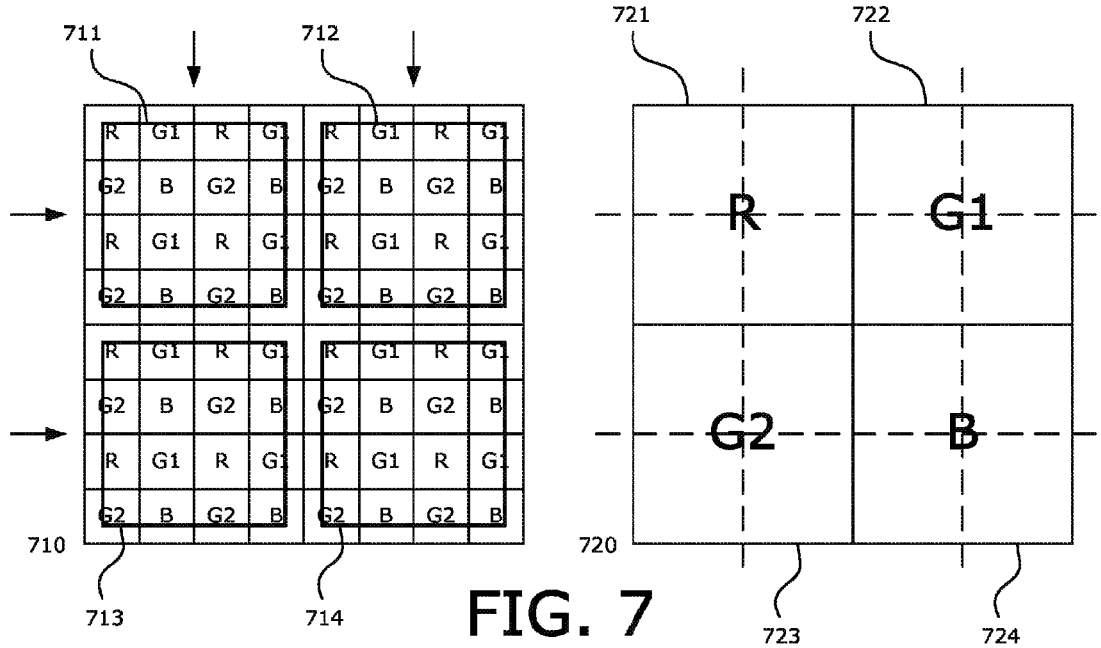
FIG. 6
FIG. 7

R $\frac{1}{4} \times$

| 1 | 0 | 1 | 0 | 0 | 0 |
|---|---|---|---|---|---|
| 0 | 0 | 0 | 0 | 0 | 0 |
| 1 | 0 | 1 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

G1

$\frac{1}{4} \times$

| 0 | 0 | 0 | 1 | 0 | 1 |
|---|---|---|---|---|---|
| 0 | 0 | 0 | 0 | 0 | 0 |
| 0 | 0 | 0 | 1 | 0 | 1 |
| 0 | 0 | 0 | 0 | 0 | 0 |
| 0 | 0 | 0 | 0 | 0 | 0 |
| 0 | 0 | 0 | 0 | 0 | 0 |

G2

$\frac{1}{4} \times$

| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 1 | 0 | 1 | 0 | 0 | 0 |
| 0 | 0 | 0 | 0 | 0 | 0 |
| 1 | 0 | 1 | 0 | 0 | 0 |

B $\frac{1}{4} \times$

| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 0 | 0 | 0 | 1 | 0 | 1 |
| 0 | 0 | 0 | 0 | 0 | 0 |
| 0 | 0 | 0 | 1 | 0 | 1 |

| 13 | 0 | 13 | 0 | 3 | 0 |
|---|---|---|---|---|---|
| 0 | 0 | 0 | 0 | 0 | 0 |
| 13 | 0 | 13 | 0 | 2 | 0 |
| 0 | 0 | 0 | 0 | 0 | 0 |
| 3 | 0 | 2 | 0 | 2 | 0 |
| 0 | 0 | 0 | 0 | 0 | 0 |

$\frac{1}{64} \times$

G1

| 0 | 3 | 0 | 13 | 0 | 13 |
|---|---|---|---|---|---|
| 0 | 0 | 0 | 0 | 0 | 0 |
| 0 | 2 | 0 | 13 | 0 | 13 |
| 0 | 0 | 0 | 0 | 0 | 0 |
| 0 | 2 | 0 | 2 | 0 | 3 |
| 0 | 0 | 0 | 0 | 0 | 0 |

$\frac{1}{64} \times$

G2

| 0 | 0 | 0 | 0 | 0 | 0 |
|---|---|---|---|---|---|
| 3 | 0 | 2 | 0 | 2 | 0 |
| 0 | 0 | 0 | 0 | 0 | 0 |
| 13 | 0 | 13 | 0 | 2 | 0 |
| 0 | 0 | 0 | 0 | 0 | 0 |
| 13 | 0 | 13 | 0 | 3 | 0 |

$\frac{1}{64} \times$

B

| 0 | 0 | 0 | 0 | 0 | 0 |
|---|---|---|---|---|---|
| 0 | 2 | 0 | 2 | 0 | 3 |
| 0 | 0 | 0 | 0 | 0 | 0 |
| 0 | 2 | 0 | 13 | 0 | 13 |
| 0 | 0 | 0 | 0 | 0 | 0 |
| 0 | 3 | 0 | 13 | 0 | 13 |

$\frac{1}{64} \times$

FIG. 9

$\frac{1}{3} \times$ R

| 1 | 0 | 1 | 0 | 1 | 0 |
|---|---|---|---|---|---|
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

$\frac{1}{3} \times$ G1

| 0 | 1 | 0 | 1 | 0 | 1 |
|---|---|---|---|---|---|
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

$\frac{1}{3} \times$ G2

| 0 | 0 | 0 | 0 | 0 | 0 |
|---|---|---|---|---|---|
| 1 | 0 | 1 | 0 | 1 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

$\frac{1}{3} \times$ B

| 0 | 0 | 0 | 0 | 0 | 0 |
|---|---|---|---|---|---|
| 0 | 1 | 0 | 1 | 0 | 1 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

| 1 | 0 | 1 | 0 | 1 | 0 |
|---|---|---|---|---|---|
| 0 | 0 | 0 | 0 | 0 | 0 |
| 1 | 0 | 1 | 0 | 1 | 0 |
| 0 | 0 | 0 | 0 | 0 | 0 |
| 0 | 0 | 0 | 0 | 0 | 0 |
| 0 | 0 | 0 | 0 | 0 | 0 |

$\frac{1}{9} \times$

G1

| 0 | 1 | 0 | 1 | 0 | 1 |
|---|---|---|---|---|---|
| 0 | 0 | 0 | 0 | 0 | 0 |
| 0 | 1 | 0 | 1 | 0 | 1 |
| 0 | 0 | 0 | 0 | 0 | 0 |
| 0 | 1 | 0 | 1 | 0 | 1 |
| 0 | 0 | 0 | 0 | 0 | 0 |

$\frac{1}{9} \times$

G2

| 0 | 0 | 0 | 0 | 0 | 0 |
|---|---|---|---|---|---|
| 1 | 0 | 1 | 0 | 1 | 0 |
| 0 | 0 | 0 | 0 | 0 | 0 |
| 1 | 0 | 1 | 0 | 1 | 0 |
| 0 | 0 | 0 | 0 | 0 | 0 |
| 1 | 0 | 1 | 0 | 1 | 0 |

$\frac{1}{9} \times$

B

| 0 | 0 | 0 | 0 | 0 | 0 |
|---|---|---|---|---|---|
| 0 | 1 | 0 | 1 | 0 | 1 |
| 0 | 0 | 0 | 0 | 0 | 0 |
| 0 | 1 | 0 | 1 | 0 | 1 |
| 0 | 0 | 0 | 0 | 0 | 0 |
| 0 | 1 | 0 | 1 | 0 | 1 |

$\frac{1}{9} \times$

| 72 | 0 | 72 | 0 | 34 | 0 |
|---|---|---|---|---|---|
| 0 | 0 | 0 | 0 | 0 | 0 |
| 72 | 0 | 72 | 0 | 28 | 0 |
| 0 | 0 | 0 | 0 | 0 | 0 |
| 34 | 0 | 28 | 0 | 28 | 0 |
| 0 | 0 | 0 | 0 | 0 | 0 |

$\frac{1}{440} \times$

G1

| 0 | 34 | 0 | 72 | 0 | 72 |
|---|---|---|---|---|---|
| 0 | 0 | 0 | 0 | 0 | 0 |
| 0 | 28 | 0 | 72 | 0 | 72 |
| 0 | 0 | 0 | 0 | 0 | 0 |
| 0 | 28 | 0 | 28 | 0 | 34 |
| 0 | 0 | 0 | 0 | 0 | 0 |

$\frac{1}{440} \times$

G2

| 0 | 0 | 0 | 0 | 0 | 0 |
|---|---|---|---|---|---|
| 34 | 0 | 28 | 0 | 28 | 0 |
| 0 | 0 | 0 | 0 | 0 | 0 |
| 72 | 0 | 72 | 0 | 28 | 0 |
| 0 | 0 | 0 | 0 | 0 | 0 |
| 72 | 0 | 72 | 0 | 34 | 0 |

$\frac{1}{440} \times$

B

| 0 | 0 | 0 | 0 | 0 | 0 |
|---|---|---|---|---|---|
| 0 | 28 | 0 | 28 | 0 | 34 |
| 0 | 0 | 0 | 0 | 0 | 0 |
| 0 | 28 | 0 | 72 | 0 | 72 |
| 0 | 0 | 0 | 0 | 0 | 0 |
| 0 | 34 | 0 | 72 | 0 | 72 |

$\frac{1}{440} \times$

| .31 | 0 | .31 | 0 | .31 | 0 |
|---|---|---|---|---|---|
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

(2)

| .31 | 0 | .31 | 0 | .31 | 0 |
|---|---|---|---|---|---|
| 0 | 0 | 0 | 0 | 0 | 0 |
| .31 | 0 | .31 | 0 | .31 | 0 |
| 0 | 0 | 0 | 0 | 0 | 0 |
| .31 | 0 | .31 | 0 | .31 | 0 |
| 0 | 0 | 0 | 0 | 0 | 0 |

(3)

| .31 | 0 | .31 | 0 | 0 | 0 |
|---|---|---|---|---|---|
| 0 | 0 | 0 | 0 | 0 | 0 |
| .31 | 0 | .31 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

(4)

| .72 | 0 | .72 | 0 | 0 | 0 |
|---|---|---|---|---|---|
| 0 | 0 | 0 | 0 | 0 | 0 |
| .72 | 0 | .72 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

(5)

| .82 | 0 | .82 | 0 | 1.8 | 0 |
|---|---|---|---|---|---|
| 0 | 0 | 0 | 0 | 0 | 0 |
| .82 | 0 | .82 | 0 | 1.8 | 0 |
| 0 | 0 | 0 | 0 | 0 | 0 |
| 1.8 | 0 | 1.8 | 0 | 4.8 | 0 |
| 0 | 0 | 0 | 0 | 0 | 0 |

FIG. 17

POWER REDUCTION FOR IMAGE SENSOR WITH RAW IMAGE SCALER

BACKGROUND OF THE INVENTION

1. Field of the Invention

This application relates generally to digital image scaling. More specifically, this application relates to a raw domain image scaling system and method that maintains consistency while having reduced power consumption.

2. Description of Related Art

In a digital image capturing system, it is common that the resolution requirement for still image capture is higher than that of video output. In such a case, a high-resolution camera capable of supporting the resolution requirement of still image capture is often used. When the camera is used in video mode to produce a video output stream, the data is scaled down to suit the resolution of the video output. For example, a particular image sensor with 8 million pixels (megapixels or MP) can give 8 MP still images. For the same image sensor in video mode, a resolution of 1080×1920 pixels, or approximately 2 MP, may suffice to produce 1080p high-definition (HD) video. Therefore, in 1080p video mode, the image data is scaled down 3× both vertically and horizontally to provide the desired output resolution.

This scaling may be performed either in the raw domain or the RGB domain. An advantage of scaling the image data in the raw domain to the desired video resolution is that it reduces the number of pixels that must be processed through the system. As a result, a majority of processing blocks in an image pipeline or post-processing section can be operated at a lower clock rate than the clock rate required to support full-resolution processing. Operating the processing section at a lower clock rate has significant advantages in reducing electromagnetic interference and reducing power consumption of the system. These advantages are especially valuable in such applications as mobile imaging.

However, existing methods of scaling in the raw domain suffer from several disadvantages, including difficulty in maintaining a Bayer output pattern without resorting to increasingly complex, expensive, and resource-intensive logic circuitry. Additionally, such existing scaling methods suffer from inferior image quality when compared to scaling in the RGB domain. Moreover, to the extent that existing scaling methods rely on such complex, expensive, and resource-intensive logic circuitry, such methods consume prohibitive amounts of power.

Accordingly, there is a need for raw image scaling that can efficiently produce output images of high image quality (that is, with good resolution) which are free of the image artifacts produced by existing raw image scaling, and which are effective without consuming an undue amount of power.

BRIEF SUMMARY OF THE INVENTION

Various aspects of the present disclosure relate to a system and method for scaling an image. The scaling includes receiving a raw image data comprising a plurality of input pixel values, respective ones of the input pixel values corresponding to a respective pixel of an image sensor; filtering the plurality of input pixel values in a spatial domain; and filtering the plurality of input pixel values in a frequency domain according to a predetermined oversampling ratio.

In one example, the predetermined oversampling ratio is set such that an error after the filtering in the spatial domain and the filtering in the frequency domain is less than a threshold value. In an additional or alternative example, the predetermined oversampling ratio is proportional to an error in an A/D conversion.

In this manner, various aspects of the present disclosure provide for improvements in at least the underlying technical processes of image capturing and image processing.

This disclosure can be embodied in various forms, including business processes, computer-implemented methods, computer program products, computer systems and networks, user interfaces, application programming interfaces, hardware-implemented methods, signal processing circuits, image sensor circuits, application specific integrated circuits, field programmable gate arrays, and the like. The foregoing summary is intended solely to give a general idea of various aspects of the present disclosure, and does not limit the scope of the disclosure in any way.

DESCRIPTION OF THE DRAWINGS

These and other more detailed and specific features of various embodiments are more fully disclosed in the following description, reference being had to the accompanying drawings, in which:

FIG. 6 illustrates an exemplary (⅓)X scaling operation according to various aspects of the present disclosure.

FIG. 7 illustrates an exemplary (¼)X scaling operation according to various aspects of the present disclosure.

FIG. 8 illustrates an exemplary set of spatial filter coefficient arrays for use with various aspects of the present disclosure.

FIG. 9 illustrates an exemplary set of optimized spatial filter coefficient arrays for use with various aspects of the present disclosure.

FIG. 14 illustrates an exemplary binning base line filter according to various aspects of the present disclosure.

FIG. 15 illustrates an exemplary horizontal-vertical binning filter according to various aspects of the present disclosure.

FIG. 16 illustrates an exemplary set of frequency filter component arrays for use with various aspects of the present disclosure.

FIG. 17 illustrates errors for each pixel after exemplary ADCF transformations according to various aspects of the present disclosure.

DETAILED DESCRIPTION

In the following description, numerous details are set forth, such as flowcharts, data tables, and system configurations. It will be readily apparent to one skilled in the art that these specific details are merely exemplary and not intended to limit the scope of this application.

While the following description presents image scaling in the context of a Bayer-consistent scaling, the present disclosure is not so limited and may be similarly applied to any type of scaling as a particular application may require.

[Imaging System]

Figure 1A:
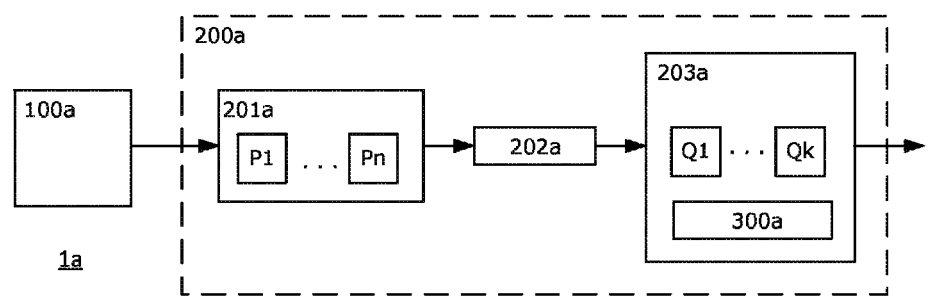
FIGS. 1A, 1B, and 1C respectively illustrate three different exemplary image capturing systems with image scaling according to various aspects of the present disclosure.
Figure 1B:
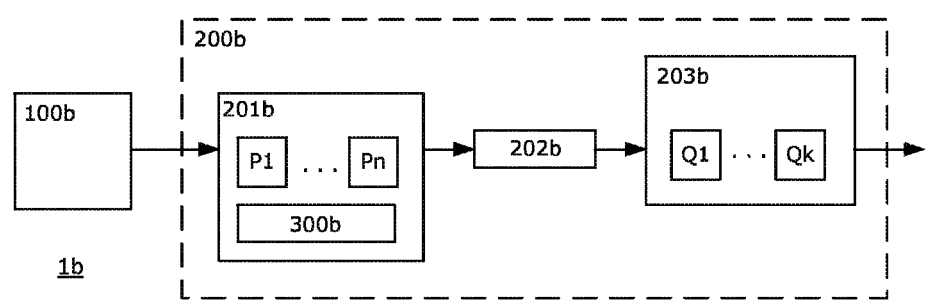
Figure 1C:
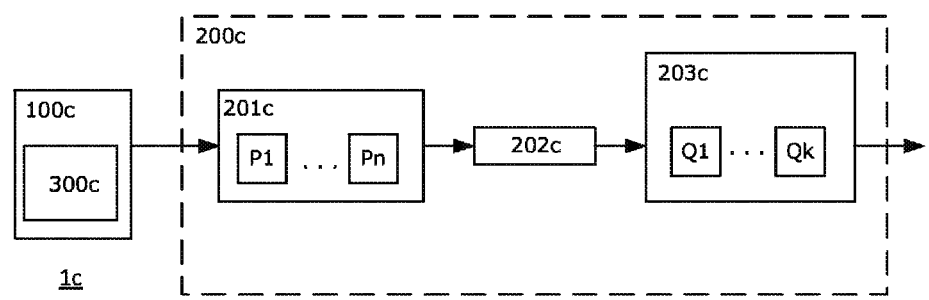

FIGS. 1A-C illustrate three different exemplary image capturing systems 1a-c that support both still image capture and video output, either at full sensor resolution or at a desired image or video resolution. All three exemplary image capturing systems 1a-c include an image sensor 100a-c and an image pipeline 200a-c. FIG. 1A illustrates a system 1a where scaling is performed in the RGB domain within image pipeline 200a; FIG. 1B illustrates a system 1b where scaling is performed in the raw domain within image pipeline 200b; and FIG. 1C illustrates a system 1c where scaling is performed in the raw domain within image sensor 100c. As used herein, "scaling" means changing the resolution of the image data to the desired output video resolution.

In all three of FIGS. 1A-C, image pipeline 200a-c includes a raw domain processing section (for example, a raw domain processing circuit) 201a-c which comprises a series of raw domain processing blocks P1, . . . , Pn. These raw domain processing blocks process raw image data (also called raw pixel data) in the same format as they are captured from the image sensor. Additionally, image pipeline 200a-c includes a demosaic section (for example, a demosaic circuit) 202a-c which converts raw image data into full color image data; that is, data wherein each pixel includes all RGB values. Furthermore, image pipeline 200a-c includes an RGB domain processing section (for example, an RGB domain processing circuit) 203a-c which comprises a series of RGB domain processing blocks Q1, . . . , Qk. Examples of processing blocks or circuits in image pipeline 200a-c include lens artifact correction, bad pixel correction, color correction, noise filtering, sharpening, and the like.

In FIG. 1A, RGB domain processing section 203a includes an RGB scaling section (for example, a scaling circuit) 300a. In FIG. 1B, raw domain processing section 201b includes a raw scaling section 300b. In FIG. 1C, image sensor 100c includes scaling section 300c. While the three exemplary views show only a single RGB or raw scaling section, exemplary image capturing systems may have the capability of supporting both raw domain image scaling and RGB domain image scaling. In such case, both a raw scaling section and an RGB scaling section would be present in the same image capturing system. Such an arrangement would provide the user or system designer with the capability of selecting either raw scaling, RGB scaling, or both, to suit specific operating conditions as desired.

The raw scaling techniques described herein improve the functioning of the image sensor and/or the image pipeline by allowing it to produce output images of high quality with fewer artifacts and at a reduced power consumption.

Image pipeline 200a-c may be implemented either in hardware, software, or a mixture of both. Examples of hardware implementations include application specific integrated circuit (ASIC), field programming logic array (FPGA), other programmable logic circuits, discrete circuit elements, and the like. Examples of software implementations include firmware in an embedded chip, software in digital signal processors (DSP), software in a simulator, software in a graphics processing unit (GPU), software in a general purpose central processing unit (CPU), and the like. A mixture of hardware and software may also be used wherein some blocks in image pipeline 200a-c are implemented in hardware, with the remaining blocks implemented in software. In one example, one or more of image sensor 100a-c and image pipeline 200a-c, or subunits thereof, are implemented as a processing unit and a memory.

Figure 2A:
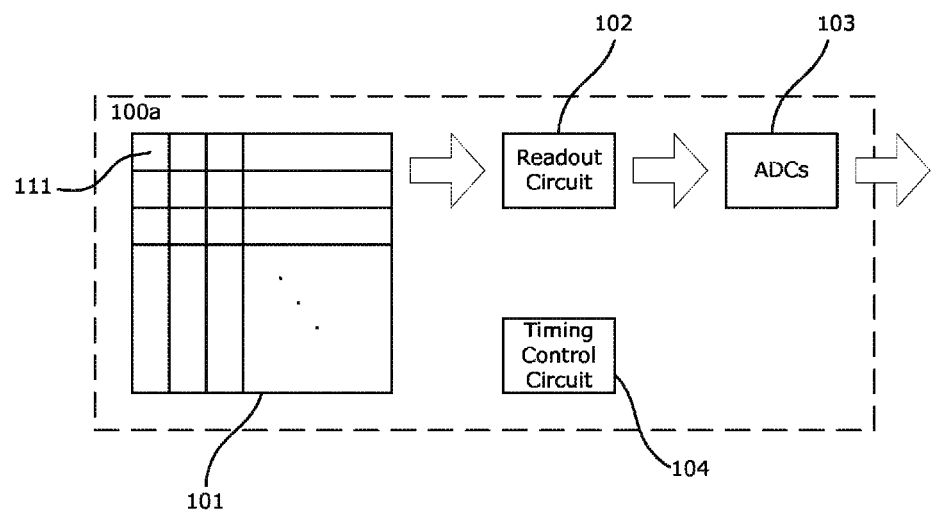
FIGS. 2A and 2B respectively illustrate an exemplary block diagram of an image sensor according to various aspects of the present disclosure.
Figure 2B:
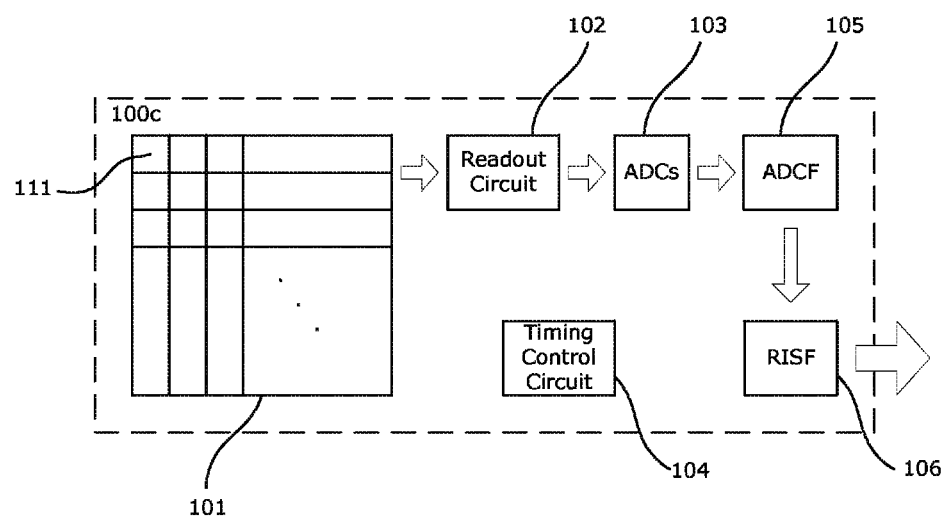

FIGS. 2A-B illustrate simplified block diagrams of exemplary image sensors 100a-c. FIG. 2A is an example of an image sensor 100a that does not itself perform scaling; for example, the image sensor 100a of FIG. 1A. FIG. 2B, on the other hand, is an example of an image sensor 100c that does perform scaling, as will be described in more detail below.

In FIG. 2A, image sensor 100a includes a pixel array 101, including a plurality of pixels 111 arranged in rows and columns. Individual pixels 111 include pixel elements such as a photosensitive element (for example, a photodiode) and associated control circuits (for example, transistors). The pixel array 101 is connected to a readout circuit 102 so that analog data values from pixels 111 may be sent to a bank of analog-to-digital converters (ADCs) 103, which convert the pixel data values into digital form. Pixel array 101, readout circuit 102, and ADCs 103 are controlled by a sequencer and timing control circuit 104 which controls the ordering of pixel reading operations and the timing of the circuit elements in pixel array 101. ADCs 103 may include single slope ADCs, cyclic ADCs, successive approximation ADCs, sigma-delta ADCs (also known as delta-sigma ADCs), and the like.

In FIG. 2B, ADCs 103 are sigma-delta ADCs. A sigma-delta ADC requires oversampling and gives out a sequence of D bit samples, where D is typically a low number such as 1. In order to generate multi-bit output digital values (for example, V-bit samples where V>D), a decimation filter is required which removes high frequency content in the D-bit sample sequence. Specifically, as illustrated in FIG. 2B, sigma-delta ADC 103 is operatively connected to an ADC filter block (ADCF) 105 to operate as a decimation filter. Also included in the sensor is a raw image scaling block (RISF) 106 which operates to scale the raw data to a different output size. As will be discussed in more detail below, the raw domain image scaling calculations in RISF 106 can be implemented with ADCF 105 as a single digital filter, which leads to a very efficient implementation that has several advantages.

In FIG. 2B, ADCF 105 and RISF 106 are illustrated as being downstream from the ADC 103. In this manner, raw scaling in the digital domain may be performed. Alternatively or additionally, the RISF 106 may be placed upstream from ADC 103 so as to perform raw scaling in the analog domain. After scaling, the analog signal is converted by the ADC and then pass through ADCF to produce the output.

Figure 3:
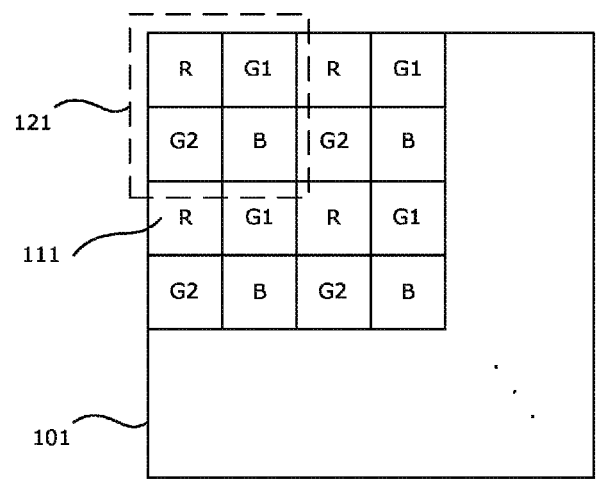
FIG. 3 illustrates an exemplary Bayer filter for use with various aspects of the present disclosure.

To provide for color images, a color filter array (CFA) is provided with image sensor 100, so that each pixel gives a data value corresponding to a single primary color. FIG. 3 illustrates a so-called "Bayer" CFA 101 for use with image sensor 100. In this example, R represents the pixels coated or provided with optical red filters, which therefore give only red pixel values. Similarly, B represents the pixels coated or provided with optical blue filters, which therefore give only blue pixel values. Both G1 and G2 represent pixels coated or provided with green optical filters, which therefore give only green pixel values. Because the green pixels sharing a row with red pixels and the green pixels sharing a row with blue pixels may have different pixel characteristics due to cross-talk and other reasons, they are labeled with the different notations G1 and G2, respectively. While the Bayer CFA illustrated in FIG. 3 uses an RGB layout, the CFA is not particularly limited in this regard. For example, other color arrangements are possible such as red/green/blue/white (RGBW); cyan/magenta/yellow (CMY); cyan/magenta/yellow/green (CMYG); and the like.

In FIG. 3, RGB Bayer CFA 101 comprises a tiled or repeating arrangement of 2×2 blocks 121 of pixels 111, comprising an R pixel in the upper left corner thereof, a G1 pixel in the upper right corner thereof, a G2 pixel in the lower left corner thereof, and a B pixel in the lower right corner thereof. One of ordinary skill in the art will readily recognize that other orderings are possible, such as B/G2/G1/R, G1/R/B/G2, G2/B/R/G1, and the like, as well as other primary or complementary color combinations such as C/M/Y/Y, or combinations of color and white such as R/G/B/W.

[General Scaling]

In practical imaging system implementations, the raw domain scaling method can be implemented either in hardware or software, or a mixture of both. For software implementations, the calculations in the scaling method can be implemented using embedded processors, digital signal processors, general purpose processors, software simulation units, and the like. For hardware implementations, the calculations in the scaling method can be implemented using digital means or analog means. Digital implementation in hardware uses digital logic elements such as gates, latches, arithmetic units, and the like. The logic elements can be included into an ASIC, an FPGA, discrete elements, or other programmable circuits. Analog implementation in hardware can include capacitive or resistive circuit elements such as summing junctions, voltage or current dividers, operational amplifiers, and the like.

The raw scaling method can be considered a filtering process followed by decimation. Scaling occurs according to a scaling factor (1/N)X, where a Bayer input region of 2N×2N is processed to produce a 2×2 Bayer output region.

Figure 4:
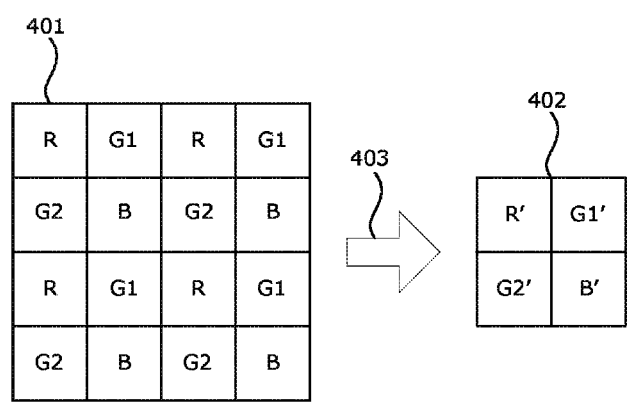
FIG. 4 illustrates an exemplary (½)X scaling operation according to various aspects of the present disclosure.

FIG. 4 illustrates a general example of a scaling method where N=2; that is, having a scaling factor of (½)X. That is, the output data has a resolution in both the row and column directions which is ½ the resolution of the input data. In this example, a Bayer input region of 4×4 is processed to produce a 2×2 Bayer output region. As illustrated in FIG. 4, input raw data 401 is converted into scaled output data 402 by applying a scaling transformation 403, which is illustrated in more detail in FIG. 5.

Figure 5:
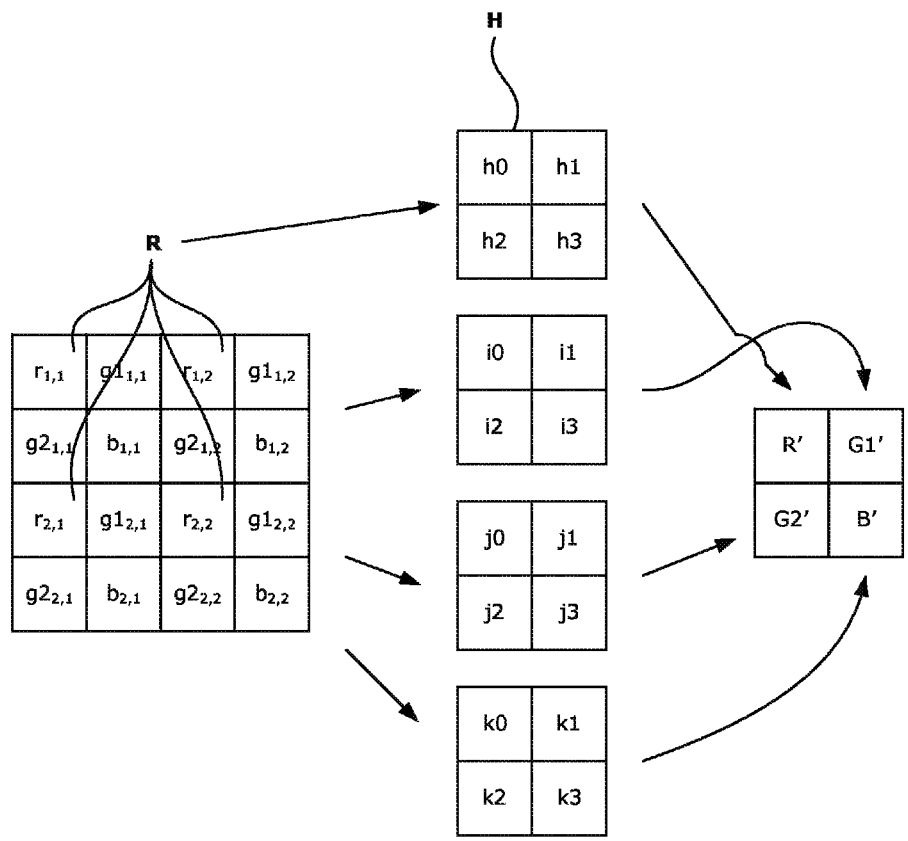
FIG. 5 illustrates an exemplary filtering representation for scaling according to various aspects of the present disclosure.

In FIG. 5, raw input pixels in each tile of size 4×4 are processed by four filters to give a 2×2 block in the output raw image. In the particularly illustrated filtering procedure, the pixel values of each red pixel are considered to be in a red pixel array R defined as $\{r_{1,1}, r_{1,2}, r_{2,1}, r_{2,2}\}$. Red pixel array R is operated on by a red spatial filter coefficient array H defined as $\{h0, h1, h2, h3\}$ to provide an output red pixel R'. Specifically, each element of red pixel array R is multiplied by the corresponding element of red spatial filter coefficient array H. That is, the coefficients in the red filter array are weights to be applied to the corresponding pixel values in the red pixel array. The products are then added together and divided by the sum of all elements of red spatial filter coefficient array H to produce the output red pixel R'. Mathematically, this is represented by the following expression (1):

$$R' = \frac{r_{1,1}h0 + r_{1,2}h1 + r_{2,1}h2 + r_{2,2}h3}{h0 + h1 + h2 + h3} \quad (1)$$

Similarly, the pixel values of each green pixel in red rows are considered to be in a first green pixel array G1 defined as $\{g1_{1,1}, g1_{1,2}, g1_{2,1}, g1_{2,2}\}$ and are operated on by a first green spatial filter coefficient array I defined as $\{i0, i1, i2, i3\}$ to output first green pixel G1'; the pixel values of each green pixel in blue rows are considered to be in a second green pixel array G2 defined as $\{g2_{1,1}, g2_{1,2}, g2_{2,1}, g2_{2,2}\}$ and are operated on by a second green spatial filter coefficient array J defined as $\{j0, j1, j2, j3\}$ to output second green pixel G2'; and the pixel values of each blue pixel are considered to be in a blue pixel array B defined as $\{b_{1,1}, b_{1,2}, b_{2,1}, b_{2,2}\}$ and are operated on by a blue spatial filter coefficient array K defined as $\{k0, k1, k2, k3\}$ to output blue pixel B'. These operations are represented by the following expressions (2)-(4):

$$G1' = \frac{g1_{1,1}i0 + g1_{1,2}i1 + g1_{2,1}i2 + g1_{2,2}i3}{i0 + i1 + i2 + i3} \quad (2)$$

$$G2' = \frac{g2_{1,1}j0 + g2_{1,2}j1 + g2_{2,1}j2 + g2_{2,2}j3}{j0 + j1 + j2 + j3} \quad (3)$$

$$B' = \frac{b_{1,1}k0 + b_{1,2}k1 + b_{2,1}k2 + b_{2,2}k3}{k0 + k1 + k2 + k3} \quad (4)$$

The filtering representation described above can be generalized to other scaling factors (1/N)X for any integer N. For a scaling factor (1/N)X, an input region of size 2N×2N is used. In this manner, to produce an output pixel of a particular color, only input pixels of the same color are considered as an input to the filter. As a result, each filter array includes only $N^2$ coefficients. Alternatively, it is possible to calculate a particular color output pixel value using the pixels of other colors. In that case, the number of spatial filter coefficients used for a scaling factor (1/N)X will have more than $N^2$ terms. Additionally, the regions of support of the filters for a scaling factor (1/N)X can be expanded beyond the 2N×2N region, and in such a case the number of spatial filter coefficients used for a scaling factor (1/N)X will also have more than $N^2$ terms.

[Pixel Skipping and Binning]

Conceptually, a pixel skipping method at a scaling factor (1/N)X is one that tiles an original image with 2N×2N cells, and for each cell retains only the four pixels in a 2×2 configuration in the upper left corner of each cell. All other pixels in the cell are discarded or skipped.

Using the above filtering representation, raw pixel scaling using the pixel skipping method may be represented by the filters H=$\{1, 0, 0, 0\}$; I=$\{1, 0, 0, 0\}$; J=$\{1, 0, 0, 0\}$; and K=$\{1, 0, 0, 0\}$. For convenience of notation in the spatial filter coefficient arrays, only the coefficients corresponding to pixels of the same color are written.

The pixel skipping method may lead to a loss of information because many pixels are simply ignored. That is, for a scaling factor of (1/N)X, only one out of every $N^2$ pixels are retained and the rest are discarded.

Conceptually, a binning method at a scaling factor (1/N)X is one that tiles an input raw image with 2N×2N cells, and for each cell calculates the arithmetic averages of each color as the respective pixel values in a 2×2 cell of the output raw image. For purposes of this calculation, G1 and G2 are treated as different colors, even though they both correspond to the color green, and the averages for G1 and G2 are calculated independently.

Again using the above filtering representation, raw pixel scaling using the binning method may be represented by the filters H={¼, ¼, ¼, ¼}; I={¼, ¼, ¼, ¼}; J={¼, ¼, ¼, ¼}; and K={¼, ¼, ¼, ¼}. Again, for convenience of notation, only the coefficients corresponding to pixels of the same color are written.

In contrast to pixel skipping, binning represents an opposite approach where all the $N^2$ pixels are retained with equal weights in the output image. This may lead to a loss of resolution, create aliasing artifacts, result in uneven phase in pixels of different colors, and the like.

[Bayer-Consistent Scaling]

Pixel skipping and binning methods typically produce output images of sub-optimal quality; for example, having image artifacts, requiring expensive correction circuits, and the like. As a result, there is a need for a raw domain image scaling method which maintains Bayer consistency.

A raw domain image scaling method that maintains Bayer consistency is called "Bayer-consistent raw scaling" (BCRS). An example of BCRS with a scaling factor of (⅓)X (that is, N=3) is illustrated in FIG. 6. In this case, the input raw image is divided into tiles of size 6×6, and from each 6×6 input tile the scaling method calculates a 2×2 block of the output image. As illustrated, each 6×6 input tile 610 is divided into four 3×3 sub-tiles 611-614 that respectively represent the physical area of virtual pixel 621-624 in a block 620 of a virtual image sensor having a lower resolution equal to the scaled resolution. That is, the virtual image sensor would have ⅓ the resolution both vertically and horizontally compared to the actual image sensor used for capturing the raw image data.

Sub-tiles 611-614 are identified by the color of the corresponding virtual pixel 621-624, under the assumption that the virtual image sensor uses the same Bayer CFA as the actual image sensor. For example, sub-tile 611 is identified as an R sub-tile because it corresponds to virtual pixel 621, which is positioned where the R filter would be in a Bayer CFA on the virtual image sensor. Similarly, sub-tile 612 is identified as a G1 sub-tile, sub-tile 613 as a G2 sub-tile, and 614 as a B sub-tile.

A similar example of BCRS with a scaling factor of (¼)X is illustrated in FIG. 7. That is, the input raw image is divided into tiles of 8×8, and from each 8×8 input tile the scaling method calculates a 2×2 output block. Here, each 8×8 tile 710 is divided into four 4×4 sub-tiles 711-714 that respectively represent the physical area of a virtual pixel 721-724 in a block 720 of a virtual image sensor having a resolution equal to ¼ the resolution both vertically and horizontally compared to the actual image sensor.

In both FIGS. 6-7, the geometric pixel centers of the virtual pixels 621-624 and 721-724 are indicated by dashed lines. The corresponding physical locations are indicated by arrows in input tiles 610 and 710; these are collocated with the centers of the sub-tiles 611-614 and 711-714.

In light of the above requirements, BCRS is performed so as to satisfy the following conditions: (1) only input pixels of the same color as the output are used in the calculation of the output pixel value; (2) the filter weights are concentrated within the sub-tile of the same color; and (3) the center of gravity of the filter weights for each color coincides with the geometric pixel center of the output pixel of the same color.

Taken together, these Bayer-consistency conditions form a Bayer-consistency ruleset, which provide for improved scaling quality.

To measure the degree of Bayer consistency, a criterion called a Bayer-consistency coefficient C may be defined which includes two components corresponding to conditions (2) and (3) above. The first component γ measures the concentration of filter weights within the sub-tile of the same color, and is defined according to the following expressions (5) and (6):

$$\gamma = \frac{1}{4}\sum_c \gamma_c \quad (5)$$

$$\gamma_c = \frac{\sum_{c\ sub-tile}(\text{filter coefficients for } c \text{ colored pixels})^2}{\sum_{all\ sub-tiles}(\text{filter coefficients for } c \text{ colored pixels})^2} \quad (6)$$

For a filter of color c where the weights are completely concentrated within the c sub-tile (that is, with non-zero weights only inside the c sub-tile), $\gamma_c$ achieves a maximum value of 1. Accordingly, each $\gamma_c$ has a possible range of values between 0 and 1, and hence γ is also between 0 and 1.

The second component β measures the deviation of the center of gravities of the filter weights from the geometric pixel centers of the output image; that is, geometric pixel centers of a lower resolution virtual grid. It is defined according to the following expressions (7) and (8):

$$\beta = \max\left(1 - \frac{1}{4}\sum_c D_c, 0\right) \quad (7)$$

$$D_c = \frac{\sqrt{(d_c^h)^2 + (d_c^v)^2}}{N\Delta} \quad (8)$$

Above, Δ is the length of the input pixel, $d_c^h$ and $d_c^v$ are the horizontal and vertical distances, respectively, between the center of gravity of the spatial filter coefficients for the color c and the geometric pixel center of the c color pixel in the corresponding virtual grid, and N is the integer in the scaling factor (1/N)X. For a filter where the center of gravities of the spatial filter coefficient in all four colors coincide with the geometric pixel center of the output pixel of respective colors, $D_c$=0 for all c and β achieves a maximum value of 1. Hence, β is between 0 and 1.

The calculations of $D_c$ in expression (8) above assume that the pixels have a square shape; that is, both the width and height of the pixels are equal to Δ. In the case of rectangular pixels, the calculations can be performed by first normalizing $d_c^h$ and $d_c^v$ by the width and height, respectively, of the pixel, and then calculating $D_c$ as the root mean square of the normalized values.

To consider the overall effect of both γ and β, Bayer-consistency coefficient C is defined according to the following expression (9):

$$C = \mu\gamma + (1-\mu)\beta \quad (9)$$

The parameter μ has a value between 0 and 1, and is used as a weight for the two components γ and β. Therefore, as is readily apparent, C has a possible range of values between 0 and 1. For performance evaluation, μ=0.5 may be used. The performance evaluation parameter μ has a value between 0 and 1, and is used as a weight for the two components γ and β. In the above expression, a high γ indicates a high degree of image sharpness, whereas a high β indicates an image free from jagged edges. A value of μ=0.5 is chosen for a balance between image sharpness and an image free of jagged edges. Using this definition, raw scaling filters with higher values of C are preferred. In other words, filters which exhibit a higher degree of Bayer-consistency lead to higher image quality; for example, having C≥0.65. More preferably, C≥0.8. Most preferably, C>0.9.

For comparison, consider the pixel skipping and binning scaling methods described above. For pixel skipping at a scaling factor of (½)X, the values of $\gamma_c$ are 1, 0, 0, 0 for the colors R, G1, G2, and B, respectively. Therefore, γ=0.25. Additionally, it can be calculated that the horizontal distance $d_c^h$ equals 0.5Δ, 1.5Δ, 0.5Δ, and 1.5Δ for R, G1, G2, and B, respectively; whereas the vertical distance $d_c^v$ equals 0.5Δ, 0.5Δ, 1.5Δ, and 1.5Δ for R, G1, G2, and B, respectively. Accordingly, β=0.2512. Using μ=0.5 for evaluation, the Bayer consistency coefficient C for pixel skipping is 0.2506 for a scaling factor of (½)X. By similar calculations, the Bayer consistency coefficient C for pixel skipping equals 0.1258 for (⅓)X and 0.1250 for (¼)X.

For binning at a scaling factor of (½)X, $\gamma_c$ is (¼²)/(¼²+¼²+¼²+¼²)—that is, 0.25—for each color c, and therefore γ=0.25. Both the horizontal distance $d_c^h$ and the vertical distance $d_c^v$ equal 0.5Δ for any color c, and therefore β=0.6464. Again using μ=0.5 for evaluation, the Bayer consistency coefficient C for binning is 0.4482 for a scaling factor of (½)X. By similar calculations, the Bayer consistency coefficient C for binning equals 0.4865 for (⅓)X and 0.3598 for (¼)X.

On the other hand, a BCRS filter configured to satisfy the three Bayer consistency conditions defined above provides a high Bayer consistency coefficient value and good image quality. FIG. 8 provides an example of such a filter for a scaling factor of (⅓)X. For the particular filter illustrated in FIG. 8, $\gamma_c$ is (¼²+¼²+¼²+¼²)/(¼²+¼²+¼²+¼²) for any c. Therefore, $\gamma_c$ is 1 for any color c. Additionally, $D_c$=0 for any color c. As a result, C achieves its highest possible value of 1. An extension to general scaling factors (1/N)X for any integer N which achieves the maximum value of C=1 is straightforward.

[Optimized Bayer-Consistent Scaling]

Pure BCRS can potentially produce some false colors in the high frequency areas of the output images, which can be observed from processing images of resolution charts. This is due to the maintenance of very high resolution in the scaled output images. To make further improvements, the spatial filter coefficients may be optimized. The optimization procedure for each color c involves allowing some coefficients outside of the c sub-tile to take on a non-zero value which is substantially smaller than the coefficient values inside the c sub-tile, and in the process evaluating the resulting Bayer consistency coefficient C and false coloring in the output image. While this optimization procedure implies that condition (2) described above no longer holds in a strict sense, the overall Bayer consistency coefficient C is still evaluated in the optimization to ensure a high C value so that a majority of the weights of the filter remains inside the sub-tile of the same color.

FIG. 9 illustrates an example of an optimized filter for a scaling factor of (⅓)X. For the filters in FIG. 9, γ, $d_c^h$, and $d_c^v$ are determined in the following expressions (10) and (11):

$$\gamma = \gamma_c = \frac{4 \times \left(\frac{13}{64}\right)^2}{4 \times \left(\frac{13}{64}\right)^2 + 2 \times \left(\frac{3}{64}\right)^2 + 3 \times \left(\frac{2}{64}\right)^2} = 0.9575 \quad (10)$$

$$d_c^h = d_c^v = \frac{(-1)(2 \times 13 + 3) + (2 \times 13 + 2) + (3)(3 + 2 \times 2)}{64} = 0.3125 \quad (11)$$

The above values hold for any color c, and therefore β=0.8527. Evaluating at μ=0.5, these components lead to a Bayer consistency coefficient of 0.9051, which is both close to the maximum possible value of 1 and much higher than the corresponding values for pixel skipping (0.1258) and binning (0.4865) for a scaling factor (⅓)X.

Figures 10, 11, 12:
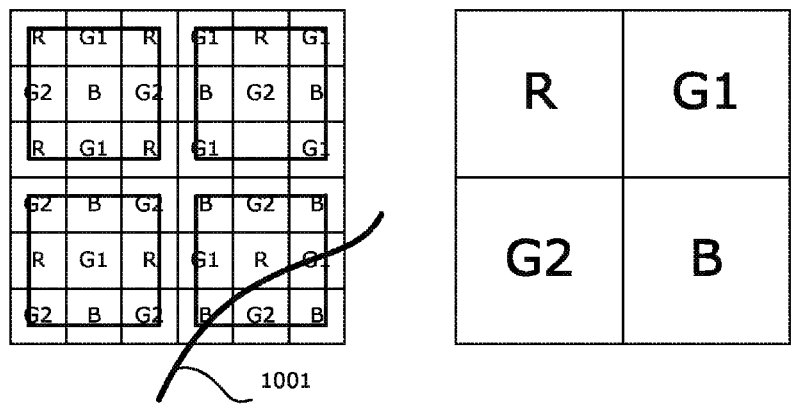
FIG. 10 illustrates an exemplary effect of an edge in an input raw image according to various aspects of the present disclosure.
FIG. 11 illustrates an exemplary (½)X scaling operation according to various aspects of the present disclosure.
FIG. 12 illustrates an exemplary (¼)X scaling operation according to various aspects of the present disclosure.

BCRS is especially effective because the Bayer consistency conditions require that the structural information (for example, edges) of the captured images be localized and kept at the correct locations in the scaled image. This is illustrated by FIG. 10. Specifically, FIG. 10 shows an edge 1001 in the scene appearing in the lower right portion of the pixel area. If an image including edge 1001 were to be scaled down by the binning method, the effect of the edge would affect all four output pixels because pixels within the edge area are used in calculating the output raw pixels of all colors. In this case the output R, G1, and G2 pixels, even though located outside of the area containing edge 1001, are affected by the presence of edge 1001. This means that the edge 1001 is spread out into the entire 2×2 output area, which corresponds to the entire 6×6 input area. On the other hand, by using BCRS (for example, using the filters of FIG. 8), only the R pixels in the R sub-tile are used in the calculation of the output R pixel value. Therefore, the output R value is not affected by the presence of edge 1001. Similarly, the output G1 and G2 values are not affected by edge 1001. That is, because edge 1001 is confined to the B sub-tile, only the output B value is affected by edge 1001. In this manner, BCRS preserves the structure of the image more accurately and produces output images of high resolution.

Although, in optimized BCRS (for example, using the filters of FIG. 9), pixels outside of the c sub-tile are used in the calculation of the output c-colored pixel, the structural limitation is similarly preserved because the filter weights of the pixels outside of the same color sub-tile are comparatively low.

Optimized BCRS filters may also be used to scale at scaling factors other than (⅓)X; for example, any (1/N)X for integer N. For example, FIG. 11 illustrates an exemplary optimized BCRS red spatial filter coefficient array for scaling factor (½)X; whereas FIG. 12 illustrates an exemplary optimized BCRS red spatial filter coefficient array for scaling factor (¼)X. Using the above expressions at μ=0.5, the BCRS filter arrays of FIGS. 11 and 12 give a Bayer consistency coefficient C of 0.8279 and 0.8166, respectively. These are much higher than the Bayer consistency coefficients C for both pixel skipping and binning as described above.

[Oversampling]

Generally, the power consumption of an image sensor ADC is dependent on the level of data accuracy required for the converted output data. In the case of a sigma-delta ADC, data accuracy is equivalent to the RMS noise, and thus a function of the oversampling ratio (OSR). Here, the OSR is a predetermined ratio. While increasing the OSR leads to a higher level of data accuracy, this is accompanied by an increase in power consumption.

It is possible to reduce the signal-to-noise ratio (SNR) of a single converted pixel without affecting the SNR of the scaled pixel. For example, in the case where a scaling factor of 2 is the x-direction is performed, the filter {½, ½} may be used. The SNR of a pixel after A/D conversion may be defined as SNR0. With this filter, the SNR of the scaled data will be SNR0×√2. That is, the scaled pixel SNR is higher than the SNR of the single converted pixel SNR0. This increased SNR is not strictly required and thus the single pixel conversion accuracy may be reduced without negatively affecting the end result of the scaling operation. In this example, the SNR may be reduced by a factor of √2 such that the SNR of the scaled data is simply SNR0.

This may be extended to situations where the SNR for each converted pixel is not necessarily equal; that is, the case where the scaling filter has different spatially distributed weights for each pixel. For example, the scaling filter {¼, ½, ¼)} results in the SNR of the scaled pixel of SNR0×(8/3), which is again higher than SNR0. Here, then, the SNR may be reduced by this factor such that the SNR of the scaled data is SNR0. This renormalization may be performed prior; for example, the central pixel (coefficient=½) may be treated as having SNR1=SNR0 whereas the two border pixels (coefficient=¼) may be treated as having SNR2=SNR3=SNR0/(√6). In any event, after the scaling operation the SNR of the converted pixel will have the same value of SNR0.

The desired SNR for each single converted pixel may be selected from a number of options to achieve the required scaled pixel SNR. This flexibility may be used to optimize ADC power consumption, as will be detailed below.

Figure 13:
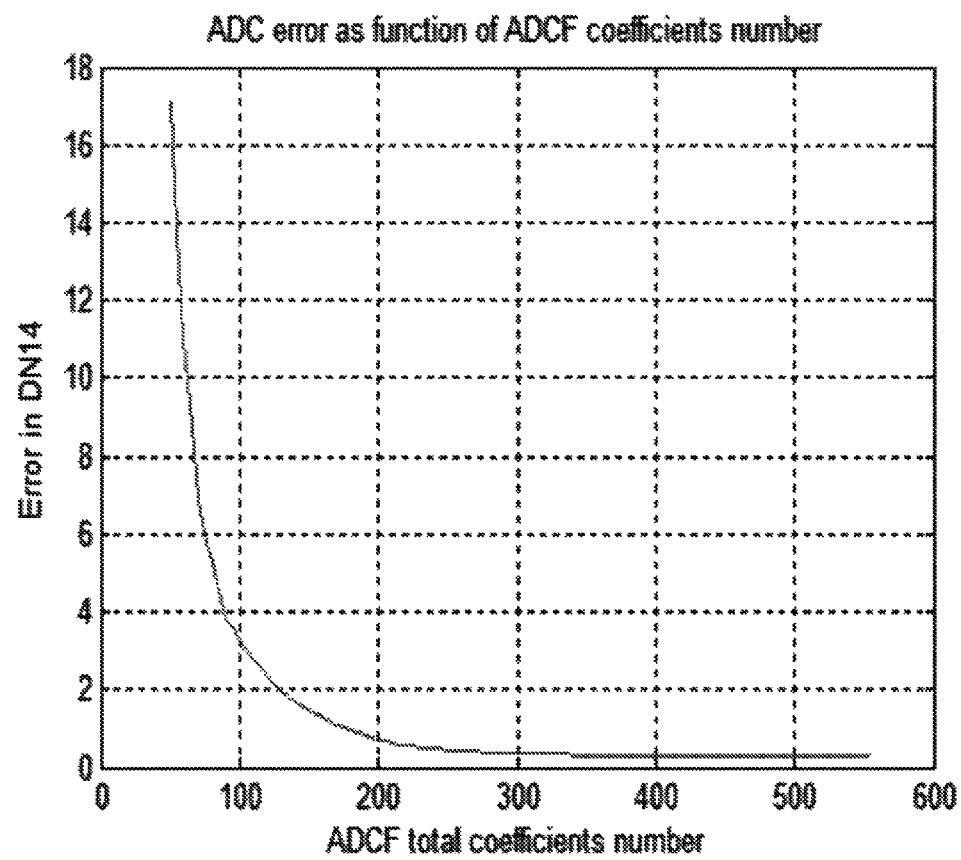
FIG. 13 illustrates an exemplary error curve for one sigma-delta conversion as a function of oversampling ratio according to various aspects of the present disclosure.

FIG. 13 illustrates the error in 14 bits for the sigma-delta conversion as a function of the number of filter coefficients used in the ADC digital filter, which corresponds to the OSR. While the exact numbers for both the x- and y-axes correspond to a specific implementation, the general relationship is not limited to one specific implementation. In the general case, the relationship is nonlinear with the conversion error decreasing quickly with an increase in the OSR. Specific rate of decrease in noise depends on the ADC filter, the structure (order) of the sigma-delta modulator, and other factors. These relationships are well known in the art and hence will not be further described.

In one aspect of the present disclosure, a noise target for the output pixels (either single or after binning) is selected for single conversion with 160 ADCF coefficients (that is, OSR=160). In this case, the ADCF error is close to the 12-bit quantization error and equal to 0.31 DN12 where DN12 is digital number at 12 bits per pixel (bpp), i.e. the size of one least significant bit in 12 bpp.

To illustrate this filtering, the case of (⅓)X (that is, N=3) is implemented using five different binning filter approaches. These may be generalized to extend to cases of (1/N) scaling in a straightforward manner. These approaches are:

(1) Binning base line filter that uses pixel binning in the horizontal direction and pixel skipping in the vertical direction, as illustrated in FIG. 14. Each single pixel is converted with an OSR=160.

(2) Pixel binning in both the horizontal and vertical directions, as illustrated in FIG. 15. As above, each single pixel is converted with OSR=160.

(3) Scaling using base BCRS filter of the type described above, as illustrated in FIG. 8. As above, each single pixel is converted with OSR=160.

(4) Scaling using base BCRS filter of the type described above, as illustrated in FIG. 8, and further with OSR optimization. Here, the OSR for each pixel conversion is selected to be 80.

(5) Scaling using full BCRS with OSR optimization using a filter with coefficients as illustrated in FIG. 16. Here the OSR for each pixel conversion is selected to be different and varies from 28 to 72. The total number of OSR coefficients is equal to 440.

In evaluating the noise level, the quantization error after each mathematical operation must be taken into account. This error is defined by the bit depth of each converted pixel after the ADC conversion and the output bit depth after the scaling procedure. The standard deviation of this error equals the least significant bit (LSB)X√(1/12).

Where the flow has 12-bit data depth after the ADC conversion and 12-bit depth after the binning procedure, the error for the single ADC conversion is represented by the following expression (12):

$$E = \sqrt{E_{SD}^2 + \frac{1}{12}} \quad (12)$$

Above, E represents the error, and $E_{SD}$ represents the sigma-delta error. In a similar manner, the error after the binning procedure is represented by the following expression (13):

$$E_{Bin} = \sqrt{\sum_{i=1}^{M} a_i^2 \frac{E_i^2}{\left(\sum_{j=1}^{M} a_j\right)^2} + \frac{1}{12}} \quad (13)$$

Above, $a_i$ is a weight coefficient of the scaling filter for the pixel i, and $E_i$ is the error of the single sigma-delta transformation without added quantization error for the pixel i. Note that equation (12) describes the error for a single pixel, whereas equation (13) describes the error for an output pixel after scaling which is calculated from M pixels (e.g. binning, BCRS, etc). The two equations have similar forms. The weighted averaging in (13) shows the effect of filtering on the output noise. As noted above, a different OSR may be used for each converted pixel, thus resulting in a different ADC error for each pixel.

Thus, using expression (12), it is possible to calculate the error for each pixel after ADCF transformation and 12-bit data storage, and to compare the relative errors for various filter approaches, such as those described above as approaches (1)-(5). These results are shown in FIG. 17 as corresponding arrays (1)-(5). For ease of illustration, only the R pixel errors are shown for the various approaches; the Gr, Gb, and B pixel errors follow in a straightforward manner.

Finally, using expression (13), it is possible to calculate the error of the pixel after the binning procedure and storing the result as 12-bit data for each approach. These results are summarized in Table 1 below, which shows the number of OSR coefficients used for each pixel, the total number of input image pixels (NIIP) used for creating one binned pixel in addition to the total output error.

|  | (1) | (2) | (3) | (4) | (5) |
| --- | --- | --- | --- | --- | --- |
| OSR used for the single pixel transformation | (160,160,160) | (160,160,160, 160,160,160, 160,160,160) | (160,160, 160,160) | (80,80,80) | (72,72,34, 72,72,28, 34,28,280) |
| NIIP | 480 (3 × 160) | 1440 (9 × 160) | 640 (4 × 160) | 320 (4 × 80) | 440 |
| Error after Binning DN12 | 0.31 | 0.31 | 0.33 | 0.47 | 0.53 |

In implementation of the filtering, the ADCF and RISF can be implemented either separately or jointly. For example, consider case (5) shown in the table. There are 9 binary bit streams from the sigma-delta modulator corresponding to the 9 input image pixel positions. Each binary sample is summed using weights equal according to the product of the ADCF filter coefficient (as a function of time) and the RISF filter coefficient (as a function of image coordinate). A total of 440 terms corresponding to the 9 input image pixel positions as shown in the figure are summed. For other oversampling ratios and other scaling factors, a similar procedure can be performed.

In Table 1 above, the particular NIIP selected for approaches (4) and (5) is only one of a number of possibilities, although this particular OSR is based on theoretically preferable values. Therefore, all approaches have an error which is less than two times the target value of 0.31. The error value 0.31 was the result of a single conversion using an ADCF with an OSR 160. This error is close to the theoretical limit of quantization error, which is the square root of $1/12$, or 0.29. However, the BCRS approaches with OSR optimization (4) and (5) use a smaller OSR for the single pixel conversions as compared to, for example, approach (1). Thus, it is possible to reduce the power consumption requirements of BCRS without compromising image quality, with only an inconsequentially small increase in the error due to any potential inaccuracies in the ADC conversion. Generally, the system can be designed so that the final error after filtering is less than two times the sigma-delta error. For the example in Table 1, the upper error value would be two times 0.31 or 0.62.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of scaling an image in an image scaling circuit, comprising:
   receiving, at the image scaling circuit, a raw image data comprising a plurality of input pixel values, respective ones of the input pixel values corresponding to a respective pixel of an image sensor;
   filtering, by the image scaling circuit, the plurality of input pixel values in a spatial domain;
   filtering, by the image scaling circuit, respective ones of the plurality of input pixel values in a frequency domain according to a corresponding predetermined oversampling ratio.

2. The method according to claim 1, wherein the corresponding predetermined oversampling ratio is set such that an error after the filtering in the spatial domain and the filtering in the frequency domain is less than two times an error of a single sigma-delta conversion.

3. The method according to claim 1, further comprising:
   in the step of filtering in the spatial domain, converting, by the image scaling circuit, the raw image data from an analog data to a digital data.

4. The method according to claim 3, wherein the corresponding predetermined oversampling ratio is proportional to an error in the step of converting.

5. The method according to claim 1, further comprising:
in the step of filtering in the spatial domain, filtering, by the image scaling circuit, the plurality of input pixel values according to a Bayer-consistent ruleset.

6. The method according to claim 5, wherein the Bayer-consistent ruleset includes:
a plurality of spatial filter weights;
a first rule that a respective output pixel value corresponds to a first color, and the corresponding subgroup of the plurality of input pixel values also corresponds to the first color;
a second rule that the plurality of input pixel values corresponds to a plurality of input sub-tiles and the spatial filter weights for the first color are concentrated within an input sub-tile of the same color; and
a third rule that a center of gravity of the spatial filter weights for the first color coincides with the geometric pixel center of the output pixel of the first color.

7. The method according to claim 1, further comprising:
outputting, from the image scaling circuit, scaled image data comprising a plurality of output pixel values, respective ones of the output pixel values corresponding to a subgroup of the plurality of input pixel values.

8. The method according to claim 1, wherein the corresponding predetermined oversampling ratio for a scaling factor larger than 1 is smaller than the corresponding predetermined oversampling ratio for a scaling factor equal to 1.

9. An image processing circuit, comprising:
an image scaling circuit including:
an input unit configured to receive raw image data comprising a plurality of input pixel values, respective ones of the input pixel values corresponding to a respective pixel of an image sensor; and
a filter unit configured to filter respective ones of the plurality of pixels in a spatial domain, and to filter the plurality of input pixel values in a frequency domain according to a corresponding predetermined oversampling ratio.

10. The image processing circuit according to claim 9, wherein corresponding the predetermined oversampling ratio is set such that an error after the filtering in the spatial domain and the filtering in the frequency domain is less than two times an error of a single sigma-delta conversion.

11. The image processing circuit according to claim 9, wherein the image scaling circuit further includes an analog-to-digital converter.

12. The image processing circuit according to claim 11, wherein the corresponding predetermined oversampling ratio is proportional to an error in the step of converting.

13. The image processing circuit according to claim 9, wherein the filter unit is configured to filter the plurality of pixels in the spatial domain according to a Bayer-consistent ruleset.

14. The image processing circuit according to claim 13, wherein the Bayer-consistent ruleset includes:
a plurality of spatial filter weights;
a first rule that a respective output pixel value corresponds to a first color, and the corresponding subgroup of the plurality of input pixel values also corresponds to the first color;
a second rule that the plurality of input pixel values corresponds to a plurality of input sub-tiles and the spatial filter weights for the first color are concentrated within an input sub-tile of the same color; and
a third rule that a center of gravity of the spatial filter weights for the first color coincides with the geometric pixel center of the output pixel of the first color.

15. The image processing circuit according to claim 9, further comprising:
an output unit configured to output scaled image data comprising a plurality of output pixel values, respective ones of the output pixel values corresponding to a subgroup of the plurality of input pixel values.

16. The image processing circuit according to claim 9, wherein the corresponding predetermined oversampling ratio for a scaling factor larger than 1 is smaller than the corresponding predetermined oversampling ratio for a scaling factor equal to 1.

17. An imaging device, comprising:
an image sensor including a plurality of pixels; and
an image scaling circuit including:
an input unit configured to receive raw image data comprising a plurality of input pixel values, respective ones of the input pixel values corresponding to a respective pixel of the image sensor; and
a filter unit configured to filter the plurality of pixels in a spatial domain, and to filter respective ones of the plurality of input pixel values in a frequency domain according to a corresponding predetermined oversampling ratio.

18. The imaging device according to claim 17, wherein the corresponding predetermined oversampling ratio is set such that an error after the filtering in the spatial domain and the filtering in the frequency domain is less than two times an error of a single sigma-delta conversion.

19. The imaging device according to claim 17, wherein the image scaling circuit further includes an analog-to-digital converter.

20. The imaging device according to claim 19, wherein the corresponding predetermined oversampling ratio is proportional to an error in the step of converting.

21. The imaging device according to claim 17, wherein the filter unit is configured to filter the plurality of pixels in the spatial domain according to a Bayer-consistent ruleset.

22. The imaging device according to claim 21, wherein the Bayer-consistent ruleset includes:
a plurality of spatial filter weights;
a first rule that a respective output pixel value corresponds to a first color, and the corresponding subgroup of the plurality of input pixel values also corresponds to the first color;
a second rule that the plurality of input pixel values corresponds to a plurality of input sub-tiles and the spatial filter weights for the first color are concentrated within an input sub-tile of the same color; and
a third rule that a center of gravity of the spatial filter weights for the first color coincides with the geometric pixel center of the output pixel of the first color.

23. The imaging device according to claim 17, further comprising:
an output unit configured to output scaled image data comprising a plurality of output pixel values, respective ones of the output pixel values corresponding to a subgroup of the plurality of input pixel values.

24. The imaging device according to claim 17, wherein the corresponding predetermined oversampling ratio for a scaling factor larger than 1 is smaller than the corresponding predetermined oversampling ratio for a scaling factor equal to 1.

25. The method according to claim 1, wherein respective ones of the plurality of pixel values are filtered in the frequency domain by corresponding predetermined oversampling ratios different from each other.

26. The image processing circuit according to claim 9, wherein the filter unit is configured to filter respective ones of the plurality of input pixel values in the frequency domain by corresponding predetermined oversampling ratios different from each other.

27. The imaging device according to claim 17, wherein the filter unit is configured to filter respective ones of the plurality of input pixel values in the frequency domain by corresponding predetermined oversampling ratios different from each other.

\* \* \* \* \*